United States Patent
Dhamankar et al.

(10) Patent No.: US 7,158,904 B2
(45) Date of Patent: Jan. 2, 2007

(54) SYSTEM AND METHOD FOR CORRECTING AN INACCURATE CLOCK

(75) Inventors: Sudhind Dhamankar, Plano, TX (US); Srinivasan Venkatraman, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 3 days.

(21) Appl. No.: 11/066,375

(22) Filed: Feb. 25, 2005

(65) Prior Publication Data

US 2006/0195281 A1    Aug. 31, 2006

(51) Int. Cl.
*G06F 19/00* (2006.01)
(52) U.S. Cl. .......................................... 702/89; 702/85
(58) Field of Classification Search ................. 702/89, 702/85; 958/540
See application file for complete search history.

(56) References Cited

U.S. PATENT DOCUMENTS 5,915,108 A * 6/1999 Frey et al. .................. 713/500
6,121,816 A * 9/2000 Tonks et al. ................. 327/296

OTHER PUBLICATIONS

Hamoui, A.A., et al., "Delta-Sigma Modulator Topologies for High-Speed High-resolution A/D converters," 2002, pp. I-356-I-359, IEEE.
Papamichalis, P.E., et al., "Delta Coding of LPC Parameters," 1983, ICASSP 83, pp. 85-88, IEEE, Boston.
Zierhofer, C.M., "Numerical Adaptive Delta Modulation—A technique for Digital Signal Representation in ASIC Applications," 1991, pp. 331-334, IEEE.

* cited by examiner

*Primary Examiner*—John Barlow
*Assistant Examiner*—Douglas N Washburn
(74) *Attorney, Agent, or Firm*—Steven A. Shaw; W. James Brady; Frederick J. Telecky, Jr.

(57) ABSTRACT

System and method for correcting an inaccurate clock with the use of an accurate reference clock. A preferred embodiment comprises repeatedly counting clock cycles in a clock signal generated by the inaccurate clock for a specified period of time, after the completion of each specified period of time, computing a delta value based on the clock cycle counts of the clock signal of the inaccurate clock, accumulating a delta sum value, and computing a clock adjustment value for the inaccurate clock based upon the delta sum value. The reference clock is used to mark the end of each specified period of time.

21 Claims, 5 Drawing Sheets

| 0 | 1 | 2 | 3 | 4 | 5 | 6 | 7 | 8 | 9 | 10 | 11 | 12 |
|---|---|---|---|---|---|---|---|---|---|----|----|----|
| 0 | 100 | 101 | 102 | 103 | 104 | 103 | 102 | 101 | 102 | 103 | 104 | 103 |

810:

| idx | 0 | 1 | 2 | 3 | 4 | 5 | 6 | 7 | 8 | 9 | 10 | 11 | 12 |
|-----|---|---|---|---|---|---|---|---|---|---|----|----|----|
| 0:  | 0 | 100 | 101 | 102 | 103 | 104 | 103 | 102 | 101 | 102 | 103 | 104 | 103 |
| 1:  | 0 | 0 | 100 | 101 | 102 | 103 | 104 | 103 | 102 | 101 | 102 | 103 | 104 |
| 2:  | 0 | 0 | 0 | 100 | 101 | 102 | 103 | 104 | 103 | 102 | 101 | 102 | 103 |
| 3:  | 0 | 0 | 0 | 0 | 100 | 101 | 102 | 103 | 104 | 103 | 102 | 101 | 102 |

815:

| idx | 0 | 1 | 2 | 3 | 4 | 5 | 6 | 7 | 8 | 9 | 10 | 11 | 12 |
|-----|---|---|---|---|---|---|---|---|---|---|----|----|----|
| 0:  | 0 | 1 | 1 | 1 | 1 | 0 | −1 | −1 | −1 | 0 | 1 | 1 | −1 |
| 1:  | 0 | 0 | 1 | 1 | 1 | 1 | 0 | −1 | −1 | −1 | 0 | 1 | 1 |
| 2:  | 0 | 0 | 0 | 1 | 1 | 1 | 1 | 0 | −1 | −1 | −1 | 0 | 1 |
| 3:  | 0 | 0 | 0 | 0 | 0 | 1 | 1 | 1 | 0 | −1 | −1 | −1 | 0 |

820:

| 0 | 1 | 2 | 3 | 4 | 5 | 6 | 7 | 8 | 9 | 10 | 11 | 12 |
|---|---|---|---|---|---|---|---|---|---|----|----|----|
| 0 | 0 | 0 | 0 | 0 | 0 | 1 | 2 | 3 | 0 | −1 | −2 | −3 |

825–835:

| label | 0 | 1 | 2 | 3 | 4 | 5 | 6 | 7 | 8 | 9 | 10 | 11 | 12 |
|-------|---|---|---|---|---|---|---|---|---|---|----|----|----|
| 825 | 0 | 100 | 201 | 303 | 303 | 406 | 410 | 412 | 412 | 410 | 408 | 408 | 410 |
| 827 | 0 | 0 | 0 | 0 | 0 | 100 | 100 | 100 | 100 | 104 | 104 | 104 | 104 |
| 829 | 0 | 0 | 101 | 102 | 103 | 104 | 103 | 102 | 101 | 102 | 103 | 104 | 103 |
| 831 | 0 | 0 | 0 | 0 | 0 | 0 | 1 | 2 | 3 | 0 | −1 | −2 | −3 |
| 833 | 0 | 100 | 201 | 303 | 406 | 410 | 412 | 412 | 410 | 408 | 408 | 410 | 412 |

840:

| 0 | 1 | 2 | 3 | 4 | 5 | 6 | 7 | 8 | 9 | 10 | 11 | 12 |
|---|---|---|---|---|---|---|---|---|---|----|----|----|

SYSTEM AND METHOD FOR CORRECTING AN INACCURATE CLOCK

TECHNICAL FIELD

The present invention relates generally to a system and method for digital communications, and more particularly to a system and method for correcting an inaccurate clock with the use of an accurate reference clock.

BACKGROUND

In modern digital devices, it is desired to minimize the cost of the device. One way to minimize the cost of a device is to use parts with as loose a tolerance as possible, since the loose tolerance parts tend to be less expensive than their tight tolerance counterparts. However, there are certain portions of a device wherein the loose tolerance of a part may result in poor performance. For example, a clock crystal for use in the generation of a clock signal typically needs to have relatively tight tolerances, especially when the performance of the device depends upon the accuracy of the clock. In a global positioning system (GPS) device, the accuracy of the clock used is critical in determining the position of the GPS device. Therefore, the clock in the GPS device needs to be accurate.

A simple technique involves the use of a clock crystal (or depending upon tolerance requirements, a temperature controlled crystal oscillator) with sufficient accuracy to meet the performance requirement of the device.

Another technique involves the counting of clock ticks of the inaccurate clock for a given amount of time using an accurate clock that already exists in the device and then comparing the results of the count with an expected number of clock ticks and using the difference to adjust the inaccurate clock.

Yet another technique uses software applications to time a count of the clock ticks of the inaccurate clock, then any difference between the count and the expected number of clock ticks can be used to adjust the inaccurate clock.

One disadvantage of the prior art is that the use of a clock crystal with sufficient accuracy can increase the overall cost of the device.

A second disadvantage of the prior art is that the use of a software application to make clock adjustments is that the software application may not be able to execute at a sufficient rate to update the inaccurate clock drift values. This can be a significant problem with inexpensive devices with processors with low processing power, limited by the low cost of the device.

SUMMARY OF THE INVENTION

These and other problems are generally solved or circumvented, and technical advantages are generally achieved, by preferred embodiments of the present invention which provides a method for correcting an inaccurate clock by using an accurate reference clock.

In accordance with a preferred embodiment of the present invention, a method for adjusting an inaccurate clock based upon an accurate clock is provided. The method comprises repeatedly counting clock cycles in a clock signal generated by the inaccurate clock for a specified period of time and after the completion of each specified period of time, the method comprises computing a delta value based on the clock cycle counts, accumulating a delta sum value, and computing a clock adjustment value based upon the delta sum value.

In accordance with another preferred embodiment of the present invention, a system for correcting an inaccurate clock is provided. The system comprises a reference counter coupled to a first clock signal provided by a reference clock, the reference counter being configured to count a specified number of clock cycles in the first clock signal and when the reference counter reaches the specified number of clock cycles, and a second counter coupled to a second clock signal provided by a target clock and to the reference counter, the second counter being configured to count a number of clock cycles in the second clock signal until told to stop. The system also comprises a reference and delta (RAD) computer coupled to the second counter, the RAD computer being configured to compute a delta value based upon a count of the second counter, a memory coupled the RAD computer, the memory to store the delta value, and an arithmetic unit coupled to the memory and to the RAD computer, the arithmetic unit being configured to compute a clock adjustment value based upon the delta value provided by the RAD computer.

An advantage of a preferred embodiment of the present invention is that in an electronic device, it permits the use of a loose tolerance crystal oscillator in place of a tight tolerance temperature controlled crystal oscillator and yet achieves similar performance. Thereby, reducing the cost of the device without suffering a performance decrease.

A further advantage of a preferred embodiment of the present invention is that the storage requirements of the present invention can be significantly smaller than a similar invention that stores the full representation of the clock values needed to meet a desired precision. Therefore, the cost of implementing the present invention can be less.

Yet another advantage of a preferred embodiment of the present invention is that only a small portion of the circuitry needs to operate at high frequencies (on the order of the clock frequencies, both the reference clock and the target clock) therefore, a significant reduction in power consumption can be realized.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a Global Positioning System (GPS) device with a loose tolerance clock. The invention may also be applied, however, to other electronic devices wherein the devices have loose tolerance clocks where a high precision clock is needed, such as devices for use in clock drift estimation and characterization of crystals with time, aging, and temperatures.

Figure 1:
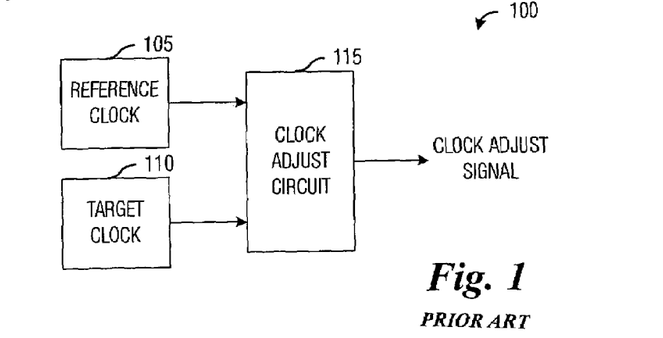
FIG. 1 is a diagram of a system for adjusting a target clock with a reference clock.

With reference now to FIG. 1, there is shown a diagram illustrating a system 100 for adjusting a target clock with a reference clock. As shown in FIG. 1, the system 100 comprises a reference clock 105 and a target clock 110, wherein the reference clock 105 may significantly more accurate than the target clock 110. The system 100 can make use of a clock signal produced by the reference clock 105 to make necessary adjustments to the target clock 110. A clock adjust circuit 115 can have as it inputs the clock signal produced by the reference clock 105 as well as a clock signal produced by the target clock 110. The clock adjust circuit 115 can then produce a clock adjust signal based upon the clock signals from the reference clock 105 and the target clock 110 that can be used to make necessary adjustments to clock circuitry making use of the clock signal produced by the target clock 110.

Figure 2:
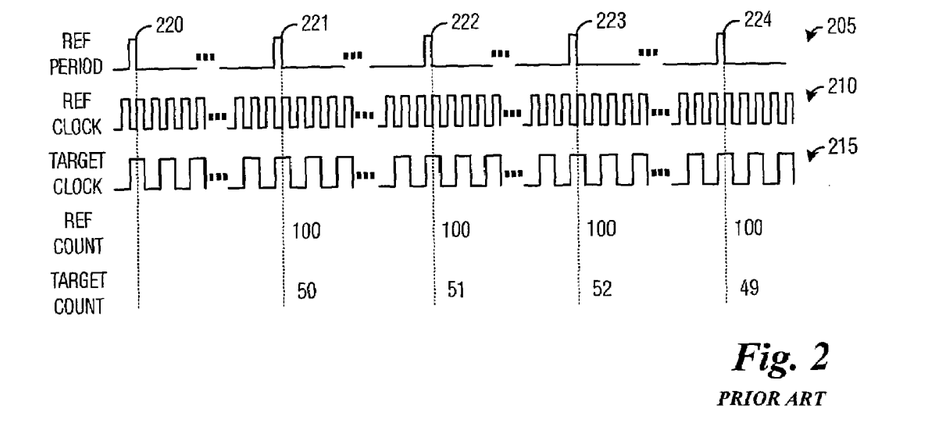
FIG. 2 is a timing diagram of several clock signals, wherein one clock signal is less accurate than another.

With reference now to FIG. 2, there is shown a diagram illustrating several clock signals, wherein one of the clock signals is not as accurate as another. The diagram shown in FIG. 2 displays three traces, a first trace 205 represents a reference time period, a second trace 210 represents a clock signal generated by a reference clock (such as the reference clock 105), and a third trace 215 represents a clock signal generated by a target clock (such as the target clock 110). The reference time period (or reference period) is a commonly arbitrary period of time that can be used to determine the presence of any drift in the target clock with respect to the reference clock. For example, the period of the reference period can be equal to a certain number of cycles of the reference clock signal or it can be equal to a certain amount of time. As shown in FIG. 2, the period of the reference period (as defined by two pulses, such as pulses 220 and 221) is equal to one hundred (100) periods of the reference clock signal.

Upon expiration of each reference period, for example, at pulses 221, 222, 223, or 224, counters that have been counting the cycles in the reference clock signal and the target clock signal stop their count and the count can be retrieved from the counters and the counters can be reset to begin counting once again. For example, if the period of the target clock signal is twice that of the reference clock signal, then upon the occurrence of the pulse 221, the counters can have the values of 100 and 50 for the reference clock signal and the target clock signal, respectively. However, if one of the clocks, such as the target clock, is not as accurate as the other, such as the reference clock, then the count in the counters may not be exactly 100 and 50 at the end of each period of the reference period. For example, at the occurrence of the pulse 222, the counters can have the values of 100 and 51, indicating that the target clock signal had one additional clock cycle more than expected, while after pulse 223, the counters can have values of 100 and 52, indicating that the target clock signal had two additional clock cycles than expected.

It is the difference in actual number of clock cycles per given period compared to expected number of clock cycles per given period that determines the accuracy of a clock. A standard reference for a clock is to provide a number representing a maximum deviation in clock cycle count per million clock cycles. This is commonly referred to as parts per million (ppm). A count of clock cycles for a period that is expected to last for one million cycles on a clock with a 40 ppm accuracy can be expected to yield a value ranging from 999,980 to 1,000,020. Therefore, a clock with a small ppm value is considered to be more accurate than a clock with a large ppm value.

The determination of the difference (a delta) between an expected clock cycle count and an actual clock cycle count for a given reference period can permit the use of an accurate clock to correct an inaccurate clock. The use of the delta value over an extended amount of time can allow a target clock with a high ppm value to maintain a tight track on a reference clock with a low ppm value while requiring a small storage capacity and low power consumption. Delta coding is widely used, and has applications in analog-to-digital conversion, digital-to-analog conversion, filtering, speech encoding, and so forth. Refer to articles entitled "Delta Coding of LPC Parameters," published 1983, "Delta-Sigma Modulator Topologies for High-speed High-resolution A/D converters," published 2002, and "Numerical Adaptive Delta Modulation—A technique for Digital Signal Representation in ASIC Applications," published 1991, for exemplary discussions on delta coding and several of its applications.

Figure 3:
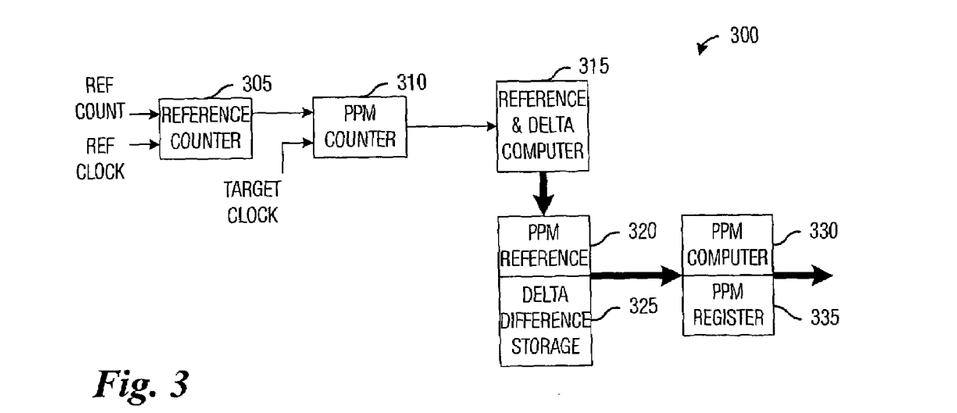
FIG. 3 is a diagram of a clock adjust circuit, according to a preferred embodiment of the present invention.

With reference now to FIG. 3, there is shown a diagram illustrating a high-level view of a clock adjust circuit 300 that can be used to provide a clock adjustment for a target clock, wherein the clock adjustment is based upon a reference clock, according to a preferred embodiment of the present invention. The clock adjust circuit 300 makes use of delta differences between an expected clock cycle count and an actual clock cycle count for a clock signal produced by the target clock for a given period of time to produce a clock adjustment signal that can be used to maintain a desired level of accuracy for the target clock. The desired level of accuracy for the target clock can be greater than the actual accuracy of the target clock and can approach the accuracy of the reference clock.

The clock adjust circuit 300 includes a reference counter 305 that can be used to generate the reference periods (or reference pulses). The reference counter 305 can make use of a clock signal produced by the reference clock (shown in FIG. 3 as "REF CLOCK") to increment its count until its count reaches a specified value (shown in FIG. 3 as "REF COUNT"). Once the count of the reference counter 305 reaches the specified value, the reference counter 305 outputs a pulse. After outputting the pulse, the reference counter 305 can reset itself and continue counting the clock signal produced by the reference clock (referred to herein as reference clock signal) to produce a subsequent pulse. The period of the pulse produced by the reference counter 305 is determined by the value of REF COUNT and the frequency of the reference clock signal. For example, if REF COUNT was specified to be 100,000 and the frequency of the reference clock was 1,000,000 Hz, then the reference counter 305 would produce a pulse once every 0.1 seconds.

The output of the reference counter 305 can be coupled to a PPM counter 310. The PPM counter 310 can also be coupled to a clock signal produced by the target clock (referred to herein as target clock signal and shown in FIG. 3 as "TARGET CLOCK") and the PPM counter 310 counts a number of clock cycles in the target clock signal between consecutive pulses produced by the reference counter 305. After receiving a pulse from the reference counter 305, the PPM counter 310 can produce at its output a numerical value equal to its count of the target clock signal and then the PPM counter 310 can reset itself to continue counting the cycles of the target clock signal. The output of the PPM counter 310 can be referred to as being a PPM value and for reference period M, can be expressed as $PPM\_Value_M$. Since the reference clock can be substantially more accurate that the target clock, any variation in the counts produced by the PPM counter 310 is considered to be as a result of the inaccuracy of the target clock.

The counts produced by the PPM counter 310 (PPM value) can be provided to a reference and delta computer (RDC) 315. The RDC 315 can be used to compute a delta value. The delta value can be defined as a difference between the expected clock cycle count and the PPM value. However, depending upon implementation, the delta value can be a difference between a current PPM value and a previous PPM value. This can be expressed as: $Delta_M = PPM\_Value_M - PPM\_Value_{M-1}$, wherein $Delta_M$ represents the delta value for period M and $PPM\_Value_M$ represents the PPM_Value (as produced by the PPM counter 310) for period M.

The delta value and the PPM value can then be provided to a PPM reference unit 320. The PPM reference unit 320 can be used to maintain a reference PPM value for use in computation of PPM result that is used in the generation of a clock adjustment signal. The reference PPM value is selected based upon factors such as desired clock accuracy, storage space limitations, and so forth. For example, if there is storage for four delta values, then the reference PPM value is every fourth PPM value produced by the PPM counter 310. A delta difference storage unit 325 can be used to store the delta values provided by the RDC 315. According to a preferred embodiment of the present invention, the delta difference storage unit 325 has a fixed amount of storage that can be dependent upon the desired precision of the target clock and once the storage is filled with delta values, the addition of a new delta value will result in the removal of a delta value, with an oldest delta value being selected for removal.

The PPM reference value and the stored delta values, stored in the PPM reference unit 320 and the delta difference storage unit 325, respectively, can be used to compute a PPM result value that can be representative of an adjustment that can be made to the target clock to ensure that the target clock meets the desired precision. The computation can be performed in a PPM computer 330. According to a preferred embodiment of the present invention, the PPM computer 330 combines the PPM reference value and the stored delta values into the PPM result value. The PPM computer 330 continually computes a new PPM result value (after each period where a new PPM value is provided by the PPM counter 310). The PPM result value can be stored in a PPM register 335 and can be used by hardware and/or software to adjust the computations being performed using the target clock. For example, a software application in a GPS device making use of the target clock to compute the position of the GPS device that takes a time that is based upon the target clock signal and combines it with the PPM result value stored in the PPM register 335 and has a time value that meets a desired accuracy specification. If the software application does not apply the PPM result value to the time based upon the target clock signal, then the time is only as precise as that of the target clock. However, once the software application applies the PPM result value, then the time can be as precise as the precision of the reference clock.

According to a preferred embodiment of the present invention, the clock adjust circuit 300 makes use of a sliding window mechanism to help improve the precision of the target clock. After a single period (of the reference period), a time value that combines the time based upon the target clock signal and the PPM result value is a precise as the target clock. After two periods, the time value can be as a one (1) bit accurate value. After four periods, the time value can be a two (2) bit accurate value. After 128 periods, the time value can be a seven (7) bit accurate value. Once the precision of the time value reaches the desired precision, then the sliding window mechanism can come into play to continuously provide the desired precision. The time that it takes to reach the desired precision can be referred to as a power-up period or a start-up period. Note that an upper limit on the precision of the time value exists in the size of the PPM counter 310. For example, if the PPM counter 310 is a seven-bit counter, then the precision in the time value cannot exceed seven bits. Once the precision upper limit is reached (for example, after 64 periods for a six (6) bit PPM counter), the precision upper limit of six bits is maintained until the clock adjust circuit 300 is reset or restarted. However, the precision is determined by the application and the size of the PPM counter, for example, can be determined based on the application.

Figure 4:
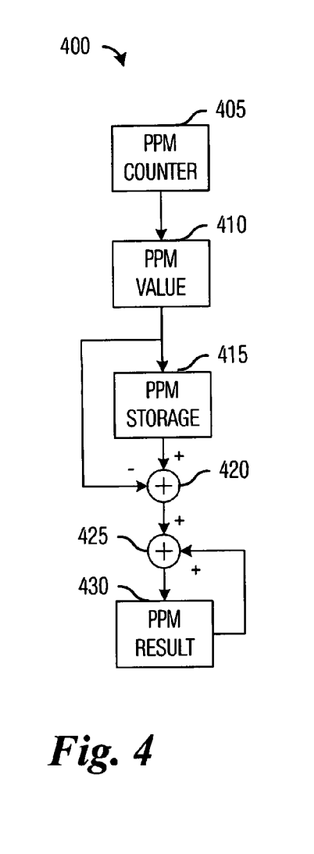
FIG. 4 is a diagram of a hardware implementation of the clock adjust circuit of FIG. 3, according to a preferred embodiment of the present invention.

With reference now to FIG. 4, there is shown a diagram illustrating exemplary hardware used in a full storage implementation of the clock adjust circuit 300, according to a preferred embodiment of the present invention. The discussion of the exemplary hardware 400 used in a full storage implementation of the clock adjust circuit 300 assumes an intent to create a target clock with seven (7) bits of precision. Note that the particular details regarding the exemplary hardware 400 can differ if a different level of precision is desired.

The exemplary hardware 400 includes a PPM counter 405 that can be used to count the number of cycles in the target clock signal. To support seven-bit precision, the PPM counter 405 should be able to store $2^7$ values. With factors such as a ratio between the reference clock and the target clock and size of the reference time period, the PPM counter 405 is preferably a 20-bit counter. After the PPM counter 405 produces a count value every period, the value can be stored in a seven-bit register (or latch or memory location), referred to as PPM value 410, and then subsequently stored in PPM storage 415, which according to a preferred embodiment of the present invention, is sized as a 128 location by two-bit memory to provide adequate storage for maintaining seven bits of precision. The size of the PPM value 410 is partially dependant upon the quality of the crystal used to generate the target clock. For example, if it is expected that the crystal driving the target clock will not exceed 100 ppm, then a PPM value 410 with the capacity to store a value of up to 128 ($2^7$) is adequate. In general, the size of the PPM value 410 should be greater than $\text{Log}_2(\text{Max\_PPM})$, wherein Max_PPM is the worst expected PPM of the crystal driving the target clock. Note that once the PPM storage 415 is full (after 128 reference periods), a newly computed PPM value that is inserted into the PPM storage 415 will result in a previously computed PPM value being removed from the PPM storage 415.

A first adder 420, used to generate the PPM result value can be implemented as a 9-bit adder, while a second adder 425, used to accumulate the PPM result can be implemented as a 14-bit adder. Finally, a 14-bit register (or latch or memory location), referred to as PPM result 430, can be used to store the PPM result value for use by hardware and/or software making use of a time that is referenced by the target clock.

Figure 5:
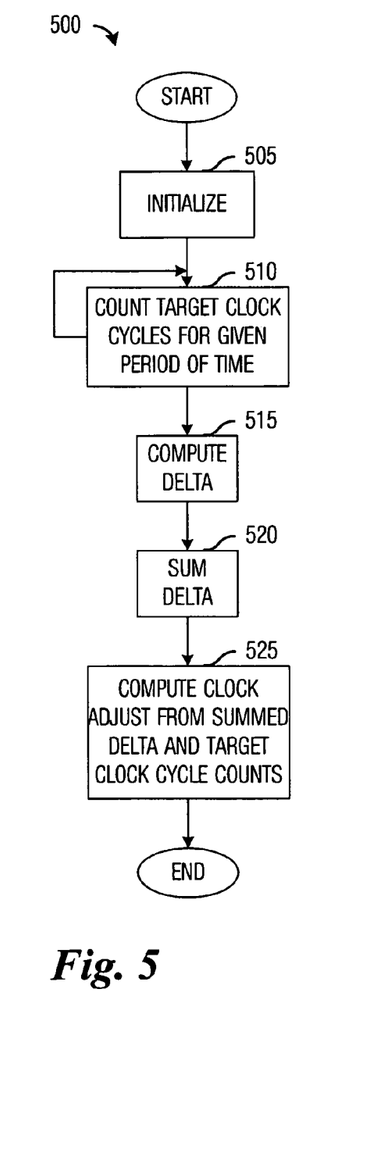
FIG. 5 is a diagram of a process for computing a clock adjust signal for a target clock using a reference clock signal; according to a preferred embodiment of the present invention.

With reference now to FIG. 5, there is shown a diagram illustrating a high-level description of a process 500 for computing a clock adjust signal for a target clock using a reference clock signal, according to a preferred embodiment of the present invention. The process 500 can begin with an initialization of hardware circuitry, memory storage units, registers, latches, and so forth, that will be used in the computation of the clock adjust signal (block 505). This initialization can occur at initial power-up or after a reset operation, for example. After the initialization completes and the process 500 becomes ready to begin operation, a count of clock cycles in a clock signal generated by a target clock for a given period of time can begin (block 510). According to a preferred embodiment of the present invention, the count of the target clock signal's clock cycles can occur for a specified amount of time, with the specified amount of time being accurately delineated by a reference clock signal that can be significantly (several orders of magnitude) more precise than the target clock signal.

The count of the target clock signal's cycles can then be used to compute a delta value (block 515). The delta value can be computed using the count of the target clock signal's cycles, referred to as current count, and a count from an earlier period of time, referred to as previous count. The previous count can be a clock cycle count from a period of time immediately preceding the period of time for the current count. Alternatively, the previous count can be from a period of time that is designated a reference period of time. Once the delta value is computed, a summation (or accumulation) of the delta value can be computed (block 520). The summation of the delta value may be a simple addition of the consecutive delta values computed by the process 500. Then, using the summation of the delta value, the current count, the previous count, and sometimes other values, the process 500 can compute the clock adjust signal for the target clock (block 525), which can be combined with a clock value that is based upon the clock signal generated by the target clock to make the clock value meet desired precision standards.

Presented below are two specific embodiments of the high-level behavioral description of the process 500 discussed above. One embodiment has simpler hardware and software requirements and yields good performance when there are relatively small variations in the clock signal generated by the target clock. Another embodiment trades off greater hardware and software complexity for the ability to tolerate significantly greater variations in the clock signal of the target clock.

Figure 6A:
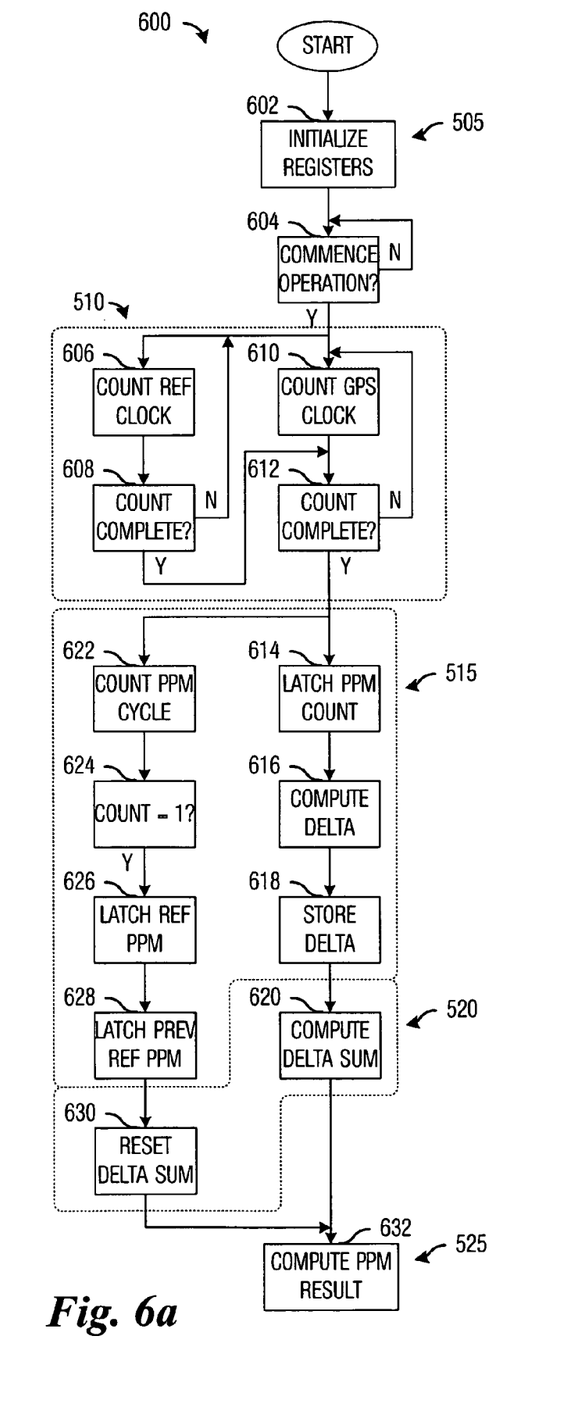
FIGS. 6a and 6b are diagrams of processes for computing a clock adjust signal for a target clock using a reference clock signal, according to a preferred embodiment of the present invention.

With reference now to FIG. 6a, there is shown a diagram illustrating a detailed behavioral description of a process 600 for computing a clock adjust signal for a target clock using a reference clock signal, according to a preferred embodiment of the present invention. The process 600 provides a simple and efficient way to generate the clock adjust signal for the target clock when the target clock signal has small or moderate variations in the number of clock cycles per reference period. For example, a typical implementation of the process 600 can tolerate variations in the order of +2 to −4 PPM/second in the target clock signal. According to a preferred embodiment of the present invention, the process 600 can execute on a controller, a processor, a custom designed integrated circuit, custom designed hardware, or so forth, of an electronic device, such as a GPS receiver, wherein there is a need to adjust a clock signal from a target clock using a reference clock signal. Although the use of hardware to implement the process 600 can be preferred for performance purposes, it can be possible to use a software implementation of the process 600 if adequate processing power is available.

The process 600 can begin with an initialization of registers, latches, memory locations, and so forth that will be used to store data values (block 602). After the registers, latches, memory, and so on have been initialized, the process 600 can wait until it is permitted to begin operation (block 604). The process 600 may be forced to wait to permit the initialization of other circuitry in the electronic device, for example. Once the process 600 is permitted to begin operations (block 604), the process 600 can begin by counting clock cycles of a reference clock signal (block 606) as well as clock cycles of a target clock signal (block 610). The counting of the reference clock signal and the target clock signal can typically occur simultaneously. While counting, the process 600 continuously checks to see if it its count of the reference clock signal is complete (block 608). The process 600 can perform this check by determining if the counter used to count the reference clock signal has reached a specified value.

Once the count of the reference clock signal is complete, the process 600 can force a stop of the count of the target clock signal (block 612). This may be done by disabling a counter enable signal line or asserting an interrupt, for example. The stopping of the count of the target clock signal (block 612) can result in the contents of a counter that is performing the count to be read and stored in a latch (or a memory location or register) (block 614). The count of the target clock signal can be referred to as PPM_Value (PPM value). After the content of the counter has been latched, the process 600 can compute a delta value (Delta_Value) based on the count (block 616). According to a preferred embodiment of the present invention, the delta value can be computed by subtracting the latched value (the count of the target clock signal for the current reference period) minus a reference count of the target clock signal (the reference count of the target clock signal can be an initial count of the target clock signal). After the delta value has been computed, it can be stored in a memory (or a series of registers) (block 618).

From the delta values stored in the memory, a delta sum (Delta_Sum) can be computed (block 620). The delta sum can be computed from the delta values stored in the memory as they are being displaced from the memory by newly stored delta values (reference discussion of FIG. 4). Note that the delta sum is an accumulation of the delta values as they are being displaced, however, the delta sum can be initialized (reset to zero (0)) periodically, once every N reference periods, wherein N is the number of reference periods needed to maintain a desired precision level for the target clock. The value of N can be referred to as a window size. For example, if it is desired that the target clock have a six-bit precision, then N (the window size) can be equal to 64, while N can be equal to 128 if the desired precision is seven-bit. Note that the window size N would also be the depth of the memory.

In addition to computing the delta value and the delta sum, the process 600 can maintain a count of the reference cycle that has just completed (block 622). The count of the reference cycle can be used to keep track of the delta values as they are being stored in the memory, as well as in the computation of the delta sum value (discussed above). According to a preferred embodiment of the present invention, the count of the reference cycle can be maintained by a counter that is incremented at the completion of each reference clock signal count (block 608). As discussed above, the window size (N) value can be used to determine when the delta sum needs to be reset, as well as updating several other values that are needed for proper operation. The process 600 can determine when it needs to reset the delta sum by checking the value of the count of the reference cycle (block 624). According to a preferred embodiment of the present invention, the process 600 can perform a modulo division of the count of the reference cycle with the window size value (N) and if the result is equal to one (1), then the process 600 will need to reset the delta sum value as well as updating the values. If the count modulo the window size value is equal to one (block 624), then the process 600 can latch the current target clock signal count as a new reference PPM value (Ref_PPM_Value) (block 626), latch an old reference PPM value as a previous reference PPM value (Prev_Ref_PPM_Value) (block 628), and reset the delta sum value (block 630).

After computing new values (delta, delta sum) and updating values (reference PPM, previous reference PPM), the process 600 can compute a PPM result value (PPM_Result) (block 632). The computation of the PPM result value can be expressed as follows:

$$PPM\_Result_M = PPM\_Result_{M-1} + Delta\_Value_M - Prev\_Ref\_PMM + Ref\_PPM - Delta\_Sum_M,$$

wherein $PPM\_Result_{M-1}$ is the PPM result value for reference cycle M-1, $Delta\_Value_M$ is the delta value for reference cycle M, $Delta\_Sum_M$ is the delta sum value for cycle M, and Ref_PPM and Prev_Ref_PMM are the PPM reference value and previous PPM reference value, respectively.

The PPM result value can also be referred to as a clock adjust value for a time value that is based upon the target clock, wherein the PPM result value can be combined with the time value to make the time meet the desired precision. According to a preferred embodiment of the present invention, as soon as the process 600 stops the count of the target clock cycles and the count is latched, the counts of the target clock cycles and the reference clock cycles can immediately begin again to ensure that no clock cycles are lost. The computations performed can be done in the background while the counts continue.

Note that until the process 600 has computed the PPM result value for at least one window size value (N) reference clock cycles, the time value that is adjusted with the PPM result value may not meet the desired precision. These initial N-1 reference clock cycles can be referred to as a start up time. However, it is possible to meet certain precision requirements for PPM result values within the start up time. For example, the time value adjusted with the PPM result after two reference clock cycles is one-bit precise, while after four reference clock cycles it is two-bit precise and after eight reference clock cycles, the adjusted time value is three-bit precise and so forth.

Figure 6B:
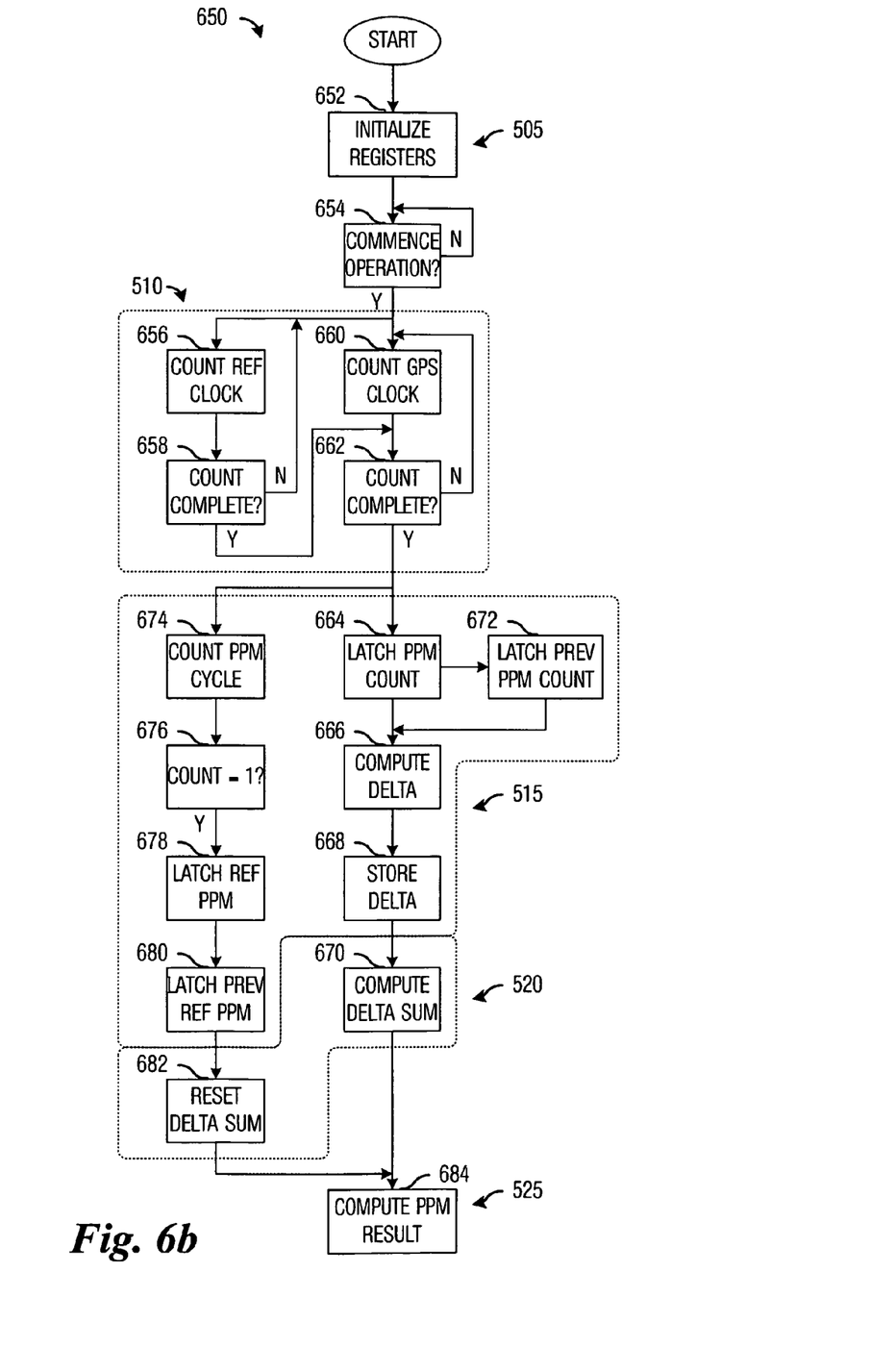

With reference now to FIG. 6b, there is shown a diagram illustrating a detailed behavioral description of a process 650 for computing a clock adjust signal for a target clock using a reference clock signal, wherein the technique is tolerant of large variations in the target clock signal, according to a preferred embodiment of the present invention. The process 600 provides an efficient way to generate the clock adjust signal for the target clock that can tolerate moderate to large variations in the number of clock cycles per reference period. For example, a typical implementation of the process 650 can tolerate a variation in the order of +254 to -512 PPM/second in the target clock signal. As with the process 600, the process 650 can execute on a controller, a processor, a custom designed integrated circuit, custom designed hardware, or so forth of an electronic device. Although the use of hardware to implement the process 650 can be preferred for performance purposes, it can be possible to use a software implementation of the process 650 if adequate processing power is available.

Similar to the process 600 (FIG. 6a), the process 650 can begin with an initialization of registers, latches, memory locations, and so forth that will be used to store data values (block 652). After the registers, latches, memory, and so on have been initialized, the process 650 can wait until it is permitted to begin operation (block 654). The process 650 may be forced to wait to permit the initialization of other circuitry in the electronic device, for example. Once the process 650 is permitted to begin operations (block 654), the process 650 can begin by counting clock cycles of a reference clock signal (block 656) as well as clock cycles of a target clock signal (block 660). The counting of the reference clock signal and the target clock signal can typically occur simultaneously. While counting, the process 650 continuously checks to see if its count of the reference clock signal is complete (block 658). The process 650 can perform this check by determining if the counter used to count the reference clock signal has reached a specified value.

Once the count of the reference clock signal is complete, the process 650 can force a stop of the count of the target clock signal (block 662). This may be done by disabling a counter enable signal line or asserting an interrupt, for example. The stopping of the count of the target clock signal (block 662) can result in the contents of a counter that is performing the count to be read and stored in a latch (or a memory location or register) (block 664). After the content of the counter has been latched, the process 650 can compute a delta value based on the count (block 666). According to a preferred embodiment of the present invention, the delta value can be computed by subtracting the latched value (the count of the target clock signal for the current reference period) minus a count of the target clock signal for the previous reference period. The count of the target clock signal for the previous reference period can be referred to as Prev_PPM_Value. After the delta value has been computed, it can be stored in a memory (or a series of registers) (block 668).

From the delta values stored in the memory, a delta sum can be computed (block 670). The delta sum can be computed from the delta values stored in the memory as they are being displaced from the memory by newly stored delta values (reference discussion of FIG. 4). Note that the delta sum is an accumulation of the delta values as they are being displaced, however, the delta sum can be initialized (reset to zero (0)) periodically, once every N reference periods, wherein N is the number of reference periods needed to maintain a desired precision level for the target clock. The value of N can be referred to as a window size. For example, if it is desired that the target clock have a six-bit precision, then N (the window size) can be equal to 64, while N can be equal to 128 if the desired precision is seven-bit. Additionally, the process 650 can latch (store) the count of the target clock signal for the current reference period for use in calculating the delta value for a subsequent reference period (block 672).

In addition to computing the delta value and the delta sum, the process 650 can maintain a count of the reference cycle that has just completed (block 674). The count of the reference cycle can be used to keep track of the delta values as they are being stored in the memory, as well as in the computation of the delta sum value (discussed above). The count of the reference cycle can be thought of as an index into the window. According to a preferred embodiment of the present invention, the count of the reference cycle can be maintained by a counter that is incremented at the completion of each reference clock signal count (block 658). As discussed above, the window size (N) value can be used determine when the delta sum needs to be reset, as well as updating several other values that is needed for proper operation. The process 650 can determine when it needs to reset the delta sum by checking the value of the count of the reference cycle (block 676). According to a preferred embodiment of the present invention, the process 650 can perform a modulo division of the count of the reference cycle with the window size value (N) and if the result is equal to one (1), then the process 650 will need to reset the delta sum value as well as updating the values. If the count modulo the window size value is equal to one (block 676), then the process 650 can latch the current target clock signal count as a new reference PPM value (block 678), latch an old reference PPM value as a previous reference PPM value (block 680), and reset the delta sum value (block 682).

After computing new values (PPM value, delta, delta sum) and updating values (previous PPM value, reference PPM, previous reference PPM), the process 650 can compute a PPM result value (block 684). The computation of the PPM result value can be expressed as follows:

$$PPM\_Result_M = PPM\_Result_{M-1} - Prev\_PPM\_Ref + PPM\_Value - Delta\_Sum_M,$$

wherein $PPM\_Result_{M-1}$ is the PPM result value for reference cycle M-1, Prev_PMM_Ref is the previous PPM reference value, PPM_Value is the count of the target clock signal for the current reference cycle, and $Delta\_Sum_M$ is the delta sum value for cycle M.

The PPM result value can also be referred to as a clock adjust value for a time value that is based upon the target clock, wherein the PPM result value can be combined with the time value to make the time meet the desired precision. According to a preferred embodiment of the present invention, as soon as the process 650 stops the count of the target clock cycles and the count is latched, the counts of the target clock cycles and the reference clock cycles can immediately begin again to ensure that no clock cycles are lost. The computations performed can be done in the background while the counts continue.

Figure 7A:
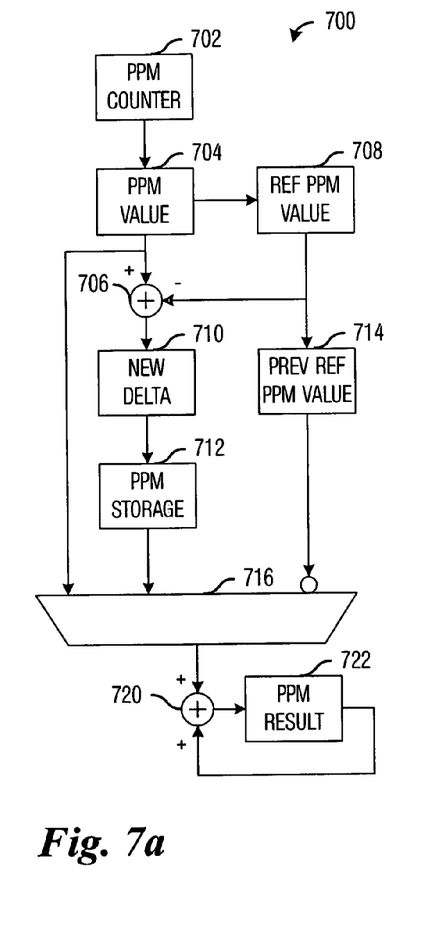
FIGS. 7a and 7b are diagrams of hardware implementations of processes for computing a clock adjust signal for a target clock using a reference clock signal; according to a preferred embodiment of the present invention.
Figure 7B:
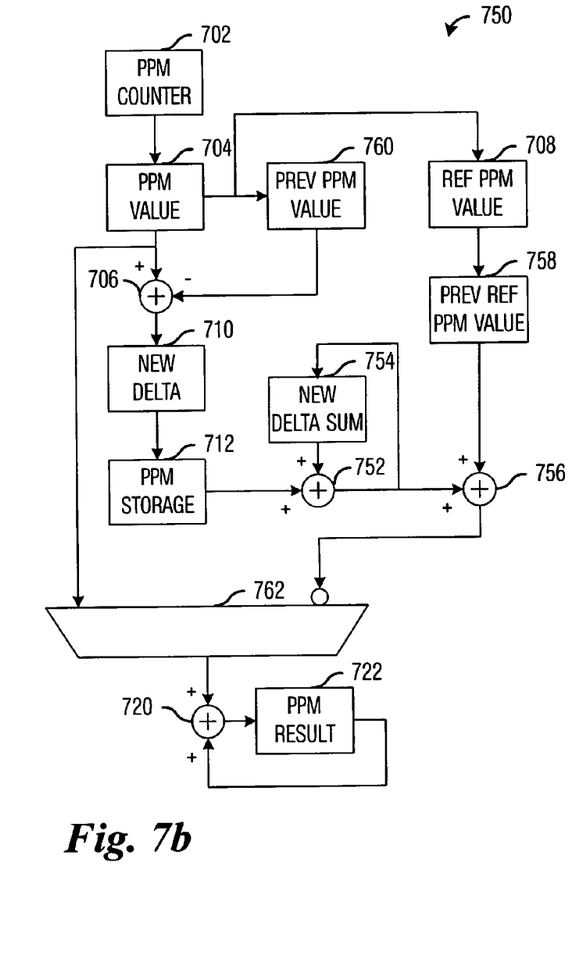

With reference now to FIGS. 7a and 7b, there are shown diagrams illustrating exemplary hardware architectures for processes 600 and 650 shown in FIG. 6a and FIG. 6b, according to a preferred embodiment of the present invention. The exemplary hardware architectures for process 600 and process 650 are shown for a seven-bit precise target clock. For a different level of precision, the exemplary hardware may retain a similar appearance but specifics, such as size of adders, registers, memories, and so forth can differ.

The diagram shown in FIG. 7a illustrates an exemplary hardware architecture 700 for the process 600 (FIG. 6a) can include a PPM counter 702 that is responsible for counting the clock cycles in a clock signal generated by the target clock. Since the desired PPM variation of the target clock is seven bits, the PPM counter 702 needs to be at least a seven-bit counter. During the counting of the clock cycles of the target clock signal, the PPM counter 702 will likely roll-over multiple times. However, this will have no detrimental effect on the precision of the hardware. At the end of a reference cycle, as marked by a signal that is generated when a reference clock counter (not shown) reaches a specified value, a count value in the PPM counter 702 can be read-out and stored in a PPM value storage unit 704. Since the PPM counter 702 is a seven-bit counter, the PPM value storage unit 704 should also be seven bits in size. The PPM value storage unit 704 can be a latch, a register, or simply a memory location of the appropriate size.

An adder 706 can be used to subtract the count of the PPM counter 702 (now stored in the PPM value storage unit 704) from a reference PPM value that is stored in a reference PPM value storage unit 708. Since the reference PPM value storage unit 708 stores a PPM value, it should be seven bits in size. Note that the reference PPM value storage unit 708 is updated with a value once every N reference cycles, wherein N is the window size. The window size can be dependent upon the desired precision, for example, for a seven-bit precise target clock, N is 128. When the reference PPM value storage unit 708 is updated, the value being replaced is saved in a previous reference PPM value storage unit 714.

An output produced by the adder 706 is a difference between the PPM value stored in the PPM value storage unit 704 and the reference PPM value and can be stored in a new delta storage unit 710. According to a preferred embodiment of the present invention, the process 500 is suited for handling PPM variations ranging from +2 to −4 PPM per reference cycle, or a total variation of approximately up to 6 PPM per reference cycle. Note that the variation of +2 to −4 PPM per reference cycle (1 million target clocks) is large even for bad crystals during the power up time when the PPM is rising. Therefore, the new delta storage unit 710 can be as small as two bits in size. The delta value in the new delta storage unit 710 can then be stored in PPM storage unit 712. Since the new delta value storage unit 710 is two bits in size, the PPM storage unit 712 can be two bits wide with N storage locations.

An arithmetic unit 716 can then be used to combine the values computed by the various hardware units in the hardware architecture 700, the output of which can be combined at a summing point 720 with a previously computed PPM result that is stored in a PPM result storage unit 722. The PPM result storage unit 722 is preferably capable of storing a 14-bit value. According to a preferred embodiment of the present invention, the PPM result that is stored in the PPM result storage unit 722 can be used by hardware and software applications to make necessary adjustments to a clock that makes use of a clock signal generated by the target clock. Once an adjustment is made to the clock, the clock can then meet the precision requirements specified, such as being seven-bit precise.

The diagram shown in FIG. 7b illustrates an exemplary hardware architecture 750 for the process 650 (FIG. 6b). Note that the appearance of the hardware architecture 750 can be substantially similar to that of the hardware architecture 700. As with the hardware architecture 700, the hardware architecture 750 can include a PPM counter 702 (preferably, seven-bits in size) that can be used for counting the clock cycles in the target clock signal and a PPM value storage unit 704 (again, preferably, seven-bits in size) to store a count value from the PPM counter 702. Note that similarly referenced hardware units (such as the PPM counter 702 and the PPM value storage unit 704) in the hardware architecture 750 and the hardware architecture 700 can be indicative that the same hardware unit can be used in either hardware architecture. Other hardware units that can be used in either hardware architectures can include a summing point 706, a reference PPM values storage unit 708 (preferably, seven-bits), a new delta storage unit 710 (preferably, two-bits), a PPM storage unit 712 (preferably, two-bits by 128 storage locations), a summing point 720, and a PPM result storage unit 722 (preferably, 14-bits).

The hardware architecture 750 has several additional hardware units to support the extra functionality. Output from the PPM storage unit 712, rather than being provided to an arithmetic unit, such as the arithmetic unit 716, is provided to a summing point 752 that is used to accumulate a delta sum value, which can be stored in a new delta sum storage unit 754. The accumulating delta sum value (from the summing point 752) can also be provided to a summing point 756. The summing point 756 can combine the accumulating delta sum value with a previous reference PPM value (stored in a previous reference PPM value storage unit 758). Additionally, a previous PPM value storage unit 760 can be used to store a PPM value from a previous reference cycle wherein a current PPM value and the previous PPM value can be combined (by summing point 706). An arithmetic unit 762 can then be used to combine the values computed by the various hardware units in the hardware architecture 750, the output of which can be combined at a summing point 720 with a previously computed PPM result that is stored in a PPM result storage unit 722. The PPM result storage unit 722 is preferably capable of storing a 14-bit value.

Figure 8:
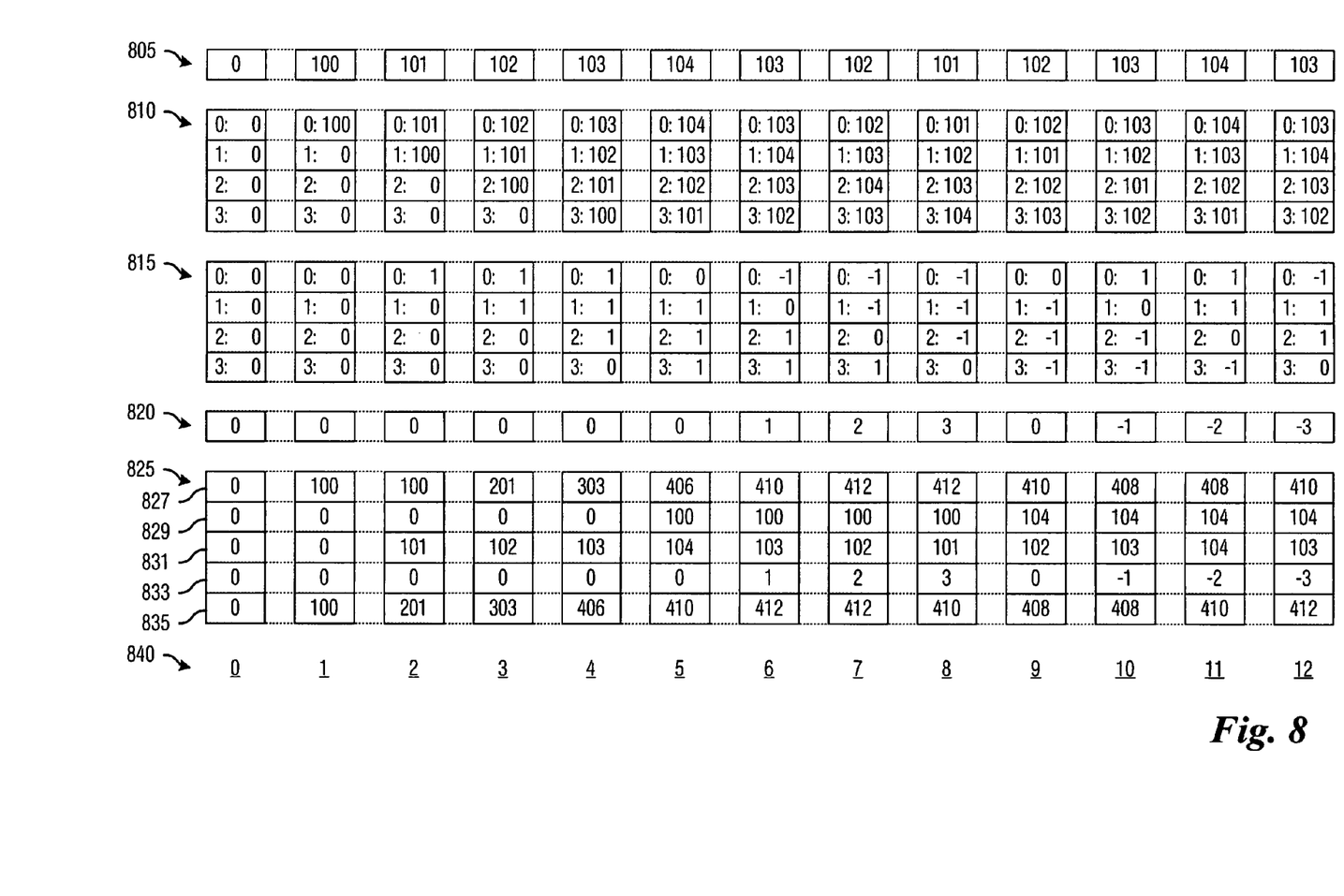
FIG. 8 is a diagram of memory states for an implementation of a process for computing a clock adjust signal for a target clock using a reference clock signal, according to a preferred embodiment of the present invention.

With reference now to FIG. 8, there is shown a diagram illustrating various values computed by the process 650 for an exemplary hardware architecture with a PPM storage unit capable of storing four values, according to a preferred embodiment of the present invention. The diagram shown in FIG. 8 displays the contents of various memory locations (or registers or latches) as a function of time, starting with the contents of the memory locations immediately after the exemplary hardware architecture has been initialized and prior to commencing operation. A first memory location 805 can provide a storage location for a PPM value as it is provided by the PPM counter 702, for example. A first series of memory locations 810 illustrates a four-value PPM value storage unit, with the individual memory locations in the first series of memory locations labeled 0, 1, 2, and 3 respectively. The memory locations in the first series of memory locations 810 can be used to store the PPM values from the first memory location 805.

A second series of memory locations 815 illustrates a four-value storage unit, again with the individual memory locations labeled 0, 1, 2, and 3 respectively. The memory locations in the second series of memory locations 815 can be used to store delta values, wherein a delta value can be computed by subtracting the current PPM value from the reference PPM value. A second memory location 820 can be used for storing an accumulated delta sum value. A memory content display 825 provides a conglomeration of values used by the process 650 to compute a PPM result value. The memory content display 825 displays a previous PPM result 827, a previous reference PPM value 829, a current PPM value 831, a current delta sum value 833, and a current PPM result 835. A numerical index 840 indicates the reference cycle.

When the numerical index 840 indicates reference cycle zero (0), the hardware architecture has just been initialized and is ready for operation and all memory locations have been reset to zero (0). At reference cycle one (1), the first memory location 805 indicates a value of 100, representing a count of 100 target clock cycles during a single reference cycle. Memory location 0 in the first series of memory locations 810 is used to hold the PPM value for the reference cycle one. Memory location 0 in the second series of memory locations 815 holds the value zero (0), the difference between previous PPM value and current PPM value. The memory content display 825 has a 100 in the previous PPM result 827 and the current PPM result 835. At reference cycle two (2), the first memory location 805 indicates a value of 101, while memory location 1 in the first series of memory locations 810 now holds the PPM value from reference cycle one and memory location 0 holds the PPM value from reference cycle two, 101 and 100, respectively. Memory location 0 in the second series of memory locations 815 holds the value one (1), the difference between the previous PPM value, 100, and the current PPM value, 101. The first series of memory locations 810 and the second series of memory locations 815 are basically first-in first-out memories, wherein a new value from the current reference cycle is pushed into memory location 0 while previous values are moved down and the value in the memory location 3 is ejected (eliminated). The memory content display 825 for the second reference cycle contains a 100 in the previous PPM result 827, a 101 in the current PPM value 831, and a 201 in the current PPM result 835.

The second memory location 820, containing the accumulated delta sum value, does not contain a non-zero value until reference cycle six (6). The accumulated delta sum value accumulates the delta values as they are being ejected from the second series of memory locations 815. Therefore, a non-zero delta value is not possible until after reference cycle two plus the number of memory locations in the second series of memory locations 815, two plus four=six. Additionally, after every fourth reference cycle, the accumulated delta sum value is reset to zero, see the second memory location 820 at reference cycle nine (9). This occurs at each window interface or every N-th reference cycles. In FIG. 8, N is equal to four. Also occurring at each window interface (every N-th reference cycles) is the updating of the previous reference PPM value. Furthermore, at every window interface, the delta value being stored in memory location 0 of the second series of memory locations 815 is also zero, since the PPM value is same as the Reference PPM value.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for adjusting an inaccurate clock based upon an accurate clock, the method comprising:
   repeatedly counting clock cycles in a clock signal generated by the inaccurate clock for a specified period of time;
   after a completion of each specified period of time, computing a delta value based on the clock cycle count;
   accumulating a delta sum value;
   and computing a clock adjustment value according to the following equation:

$$\text{PPM Result}_M = \text{PPM Result}_{M-1} + \text{Delta\_Value}_M - \text{Prev\_Ref\_PMM} + \text{Ref\_PPM} - \text{Delta\_Sum}_M$$

wherein PPM Result$_{M-1}$ is the clock adjustment value for specified period of time M−1, Delta_Value$_M$ is the delta value for specified period of time M, Delta_Sum$_M$ is the delta sum value for specified period of time M, and Ref_PPM is a reference clock cycle count and Prev_Ref_PMM is a previous reference clock cycle count;
   and adjusting said clock cycles of said inaccurate clock with said clock adjustment value.

2. A method for adjusting an inaccurate clock based upon an accurate clock, the method comprising:
   repeatedly counting clock cycles in a clock signal generated by the inaccurate clock for a specified period of time;
   after a completion of each specified-period of time, computing a delta value based on the difference between a clock cycle count of a current specific period of time and a reference clock cycle count;
   accumulating a delta sum value;
   and computing a clock adjustment value according to the following equation, $$\text{PPM Result}_M = \text{PPM Result}_{M-1} + \text{Delta\_Value}_M - \text{Prev\_Ref\_PMM} + \text{Ref\_PPM} - \text{Delta\_Sum}_M$$

wherein PPM Result$_{M-1}$ is the clock adjustment value for specified period of time M−1, Delta_Value$_M$ is the delta value for specified period of time M, Delta_Sum$_M$ is the delta sum value for specified period of time M, and Ref_PPM is a reference clock cycle count and Prev_Ref_PMM is a previous reference clock cycle count;
   and adjusting said clock cycles of said inaccurate clock with said clock adjustment value.

3. The method of claim 2, wherein the specified period of time is determined by the accurate clock.

4. The method of claim 3, wherein the specified period of time is indicated by counting a specified number of clock cycles of the accurate clock.

5. A method for adjusting an inaccurate clock based upon an accurate clock, the method comprising:
   repeatedly counting clock cycles in a clock signal generated by the inaccurate clock for a specified period of time;
   after a completion of each specified period of time, computing a delta value based-on the difference between a-clock cycle count of a current specified period of time and a reference clock cycle count;
   accumulating a delta sum value;
   computing a clock adjustment value based upon the delta sum value for N specified periods of time prior to meeting a desired level of precision, wherein N is referred to as a window size, and wherein when K modulo N is equal to zero, the delta sum value is reset, a reference clock cycle count is updated with a clock cycle count of the K-th specified period of time, a reference clock cycle count from a previous N specified periods of time is saved as a previous reference clock cycle count;
   and adjusting said clock cycles of said inaccurate clock with said clock adjustment value.

6. The method of claim 1, wherein the delta value is a difference between a clock cycle count of a current specified period of time and a clock cycled count for a specified period of time immediately preceding the current specified period of time.

7. A method for adjusting an inaccurate clock based upon an accurate clock, the method comprising:
   repeatedly counting clock cycles in a clock signal generated by the inaccurate clock for a specified period of time;
   after a completion of each specified period of time, computing a delta value as a difference between a clock cycle count of a current specific period of time and a clock cycle count for a specific period of time immediately proceeding the current specific period of time;
   accumulating a delta sum value;
   computing a clock adjustment value according to the following equation.

$$\text{PPM Result}_M = \text{PPM Result}_{M-1} + \text{Delta\_Value}_M - \text{Prev\_Ref\_PMM} + \text{Ref\_PPM} - \text{Delta\_Sum}_M$$

wherein PPM Result$_{M-1}$ is the clock adjustment value for specified period of time M−1 Delta_Value$_M$ is the delta value for specified period of time M, Delta_Sum$_M$ is the delta sum value for specified period of time M, and Ref_PPM is a reference clock cycle count and Prev_Ref_PMM is a previous reference clock cycle count;
   and adjusting said clock cycles of said inaccurate clock with said clock adjustment value.

8. A method for adjusting an inaccurate clock based upon an accurate clock the method comprising:
   repeatedly counting clock cycles in a clock signal generated by the inaccurate clock for a specified period of time;
   after a completion of each specified period of time, computing a delta value as a difference between a clock cycle count of a current specific period of time and a clock cycle count for a specific period of time immediately proceeding the current specific period of times;
   accumulating a delta sum value;

and computing a clock adjustment value for N specified periods of time prior to meeting a desired level of precision, wherein N is referred to as a window size, and wherein when K modulo N is equal to zero, the delta sum value is reset, a reference clock cycle count is updated with a clock cycle count of the K-th specified period of time, a reference clock cycle count from a previous N specified periods of time is saved ms a previous reference clock cycle count, and a zero is stored as the delta value for the specified period of time.

9. A method for adjusting an inaccurate clock based upon an accurate clock, the method comprising:
repeatedly counting clock cycles in a clock signal generated by the inaccurate clock for a specified period of time;
after a completion of each specified period of time,
computing a delta value based on the clock cycle count;
accumulating a delta sum value; and
computing a clock adjustment value based on the delta sum value for N specified periods of time prior to meeting a desired level of precision, wherein N is referred to as a window size, and wherein the delta values are stored in a memory, wherein at specified period of time K, when K>=N, then a delta value for specified period of time K−N is used to compute the delta sum.

10. The method of claim 9, wherein when K<N, zeroes (0) are used to compute the delta sum.

11. The method of claim 9, wherein the value of N is dependent upon the desired precision, and wherein N is equal to $2^{PRECISION}$, wherein PRECISION is the desired precision of the inaccurate clock.

12. The method of claim 11, when K>N, the use of the clock adjustment value to adjust a clock based upon the clock signal generated by the inaccurate clock will yield a clock meeting the desired precision.

13. The method of claim 2 further comprising, combining the clock adjustment value with a clock that is based upon the clock signal generated by the inaccurate clock.

14. The method of claim 13, wherein the combining comprises adding the clock adjustment value with a value in the clock.

15. A system for correcting an inaccurate clock, the system comprising:
a reference counter coupled to a first clock signal provided by a reference clock, the reference counter being configured to count a specified number of clock cycles in the first clock signal;
a second counter coupled to a second clock signal provided by a target clock and to the reference counter, the second counter being configured to count a number of clock cycles in the second clock signal;
a reference and delta (RAD) computer coupled to the second counter, the RAD computer being configured to compute a delta value based upon a count of the second counter;
a memory coupled the RAD computer, the memory to store the delta value;
and an arithmetic unit coupled to the memory and to the RAD computer, the arithmetic unit being configured to compute a clock adjustment value based upon the delta value provided by the RAD computer and according to the following equation, $$\text{PPM Result}_M = \text{PPM Result}_{M-1} - \text{Prev\_PMM\_Ref} + \text{PPM\_Value} - \text{Delta\_Sum}_M$$

wherein PPM Result$_{M-1}$ is the clock adjustment value for specified period of time M−1, Prev_PMM_Ref is a previous reference clock cycle count, PPM_Value is the clock cycle count for specified period of time M, and Delta_Sum$_M$ is the delta sum value for specified period of time M.

16. The system of claim 15, wherein when the count in the reference counter reaches the specified number, a value is asserted onto an output of the reference counter, and wherein when the second counter detects the value asserted on the output of the reference counter, the second counter provides its count value to the RAD computer.

17. The system of claim 16, wherein after the reference counter reaches the specified number, it repeats its count, and wherein after the second counter provides its count value to the RAD computer, the second counter repeats its count.

18. The system of claim 15, wherein each count performed by the reference counter is referred to as a reference cycle, and wherein the RAD computer computes a delta value by subtracting a count provided by the second counter for a current reference cycle from a count provided by the second counter for a reference cycle.

19. The system of claim 15, wherein each count performed by the reference counter is referred to as a reference cycle, and wherein the RAD computer computes a delta value by subtracting a count provided by the second counter for a current reference cycle from a count provided by the second counter for a reference cycle immediately before the current reference cycle.

20. The method of claim 1, wherein the delta value is a difference between a clock cycle count of a current specific period of time and a reference clock cycle count.

21. The method of claim 20, wherein the clock adjustment value is computed for N specified periods of time prior to meeting a desired level of precision, wherein N is referred to as a window size, and wherein when K modulo N is equal to zero, the delta sum value is reset, a reference clock cycle count is updated with a clock cycle count of the K-th specified period of time, a reference clock cycle count from a previous N specified periods of time is saved as a previous reference clock cycle count.

* * * * *